United States Patent [19]
Glatti et al.

[11] 3,857,804
[45] Dec. 31, 1974

[54] THERMOPLASTIC FILM FOR CONTROLLING PLANT GROWTH

[75] Inventors: Flaviano Glatti, Mestre; Manlio Guariento, Mantova; Ugo Cerruti, Milan, all of Italy

[73] Assignee: Montecatini Edison S.p.A., Milan, Italy

[22] Filed: July 7, 1969

[21] Appl. No.: 839,652

[30] Foreign Application Priority Data
July 5, 1968 Italy.................................. 18604/68

[52] U.S. Cl.... 260/23 X A, 260/41 C, 260/DIG. 43, 47/58, 161/109
[51] Int. Cl...... A01g 9/14, C08f 29/18, C08f 45/56
[58] Field of Search............. 47/58; 260/23 X, 41 C

[56] References Cited
UNITED STATES PATENTS

| | | | |
|---|---|---|---|
| 2,209,419 | 7/1940 | Rooney et al..................... | 260/41 X |
| 2,548,376 | 4/1952 | Jones et al........................ | 260/41 X |
| 3,089,280 | 5/1963 | Klaas................................ | 47/58 |
| 3,326,827 | 6/1967 | Mullin................................ | 260/23 |
| 3,542,710 | 11/1970 | Glatti................................. | 260/23 |

*Primary Examiner*—Melvyn I. Marquis
*Assistant Examiner*—Eugene C. Rzucidlo
*Attorney, Agent, or Firm*—Karl F. Ross; Herbert Dubno

[57] ABSTRACT

A thermoplastic film for controlling plant growth which has a total light transmittance to sunlight of less than 40% for light with a wavelength of 300 – 700 m$\mu$ and a light transmittance greater than 60% for wavelengths above about 900 m$\mu$ and preferably between 90 and 1,500 m$\mu$. The foil or film thickness may be 0.01 to 0.5 mm and the light transmittance characteristics thereof correspond to the following table:

| Wavelength (m$\mu$) | Total transmittance (%) |
|---|---|
| 300–500 | 0–10 |
| 500–750 | 0–35 |
| 750–900 | 0–90 |
| >900 | 60–90 |

4 Claims, No Drawings

THERMOPLASTIC FILM FOR CONTROLLING PLANT GROWTH

Our present invention relates to thermoplastic film or foil material adapted to be used for inducing, controlling or modifying plant growth and, more particularly, to growthpromoting foils adapted to be spanned across an agricultural plot in the form of a mulching foil.

In commonly assigned application Ser. No. 603,388, (U.S. Pat. No. 3,542,710) filed Dec. 20, 1966 by Flaviano Glatti, one of the present joint inventors, there is described a colored plastic film for use as an enclosure or covering material for plant beds and growth chambers. This foil is a translucent vinylchloride-based polymer containing, in the sheet material, a major proportion of a polymeric component with at least 75% by weight chemically combined vinylchloride, a thermal-stabilizing component, and an ultraviolet-absorbing component, a plasticizing component, and at least one vinylchloride dyestuff, preferably of the phthalocyanine or azo type.

It was there pointed out that such compositions are effective for the control of plants of substantially all types, in spite of the fact that one would normally consider a colored synthetic-resin sheet material to be practically useless and undesirable for growth forcing, controlled growing and growth protection of fruit, flowers or vegetables.

The vinylchloride materials are those formed by polymerizing vinylchloride alone or in admixtures with up to 25% by weight of monomers copolymerizable therewith in aqueous suspension to yield a polymeric material having a K-number between 60 and 90 and preferably a K-number of about 70.

The polymer component may consist of a major proportion of such vinylchloride-based homopolymers or copolymers in mutual admixture with less than 50% by weight of a compatible synthetic resin of the acrylic or ABS (acrylonitrile butadiene-styrene terpolymer) type, the latter includes acrylic components with or without butadiene and styrene. The term "acrylic resin" refers in such systems to acylonitrile polymers and copolymers and, therefore, includes polyacrylonitriles. The ABS terpolymers can be of the type which are formed in an aqueous suspension or latex of a synthetic elastomer to which is graftpolymerized an acrylic monomer (i.e. acrylonitrile). Thus the acrylonitrile component of the terpolymer can be any of the substituted acrylonitriles alone or together with acrylonitrile, while the styrene-based component can be styrene or a substituted styrene. Suitable polymeric materials are those made by the processes described in U.S. patent applications Ser. No. 257,874 (now abandoned but replaced by application Ser. No. 705,859 of Feb. 15, 1968, now U.S. Pat. No. 3,546,193), filed Feb. 12, 1963, Ser. No. 329,592 (now U.S. Pat. No. 3,332,918), filed Dec. 12, 1963 and Ser. No. 403,322 (now U.S. Pat. No. 3,406,136), filed Oct. 12, 1964, all as discussed in the aforementioned applications.

The thermal-stabilizing component, which is incorporated in the sheet material described in application Ser. No. 603,388 in an amount ranging between 0.5 and 4.0 parts by weight per 100 parts by weight of vinyl chloride, is composed of two stabilizing compositions including a first stabilizer constituted by barium, cadmium, lead, zinc, tin or magnesium polymer-stabilizing compounds alone or in mutual admixture and a second stabilizer (costabilizer) consisting of one or more epoxy compounds having at least one epoxy group per molecule and preferably containing 22 to 150 carbon atoms per molecule. The ultraviolet-absorber component is present in an amount ranging, from 0.05 to 2 parts by weight per 100 parts by weight of vinylchloride and may be any of the conventional ultraviolet-light absorbers hitherto employed in translucent and transparent thermoplastic material, preferably benzophenone, triazole, substituted benzophenone and substituted triazoles, alone or in mutual admixture and preferably together with at least one optical bleaching or blueing agent.

The films also include plasticizing components constituted by one or more of the known vinylchloride plasticizers, preferably of the phthalic type having 4 to 13 carbon atoms in their alkyl chains or other diesters and diesterifiable compounds with corresponding alkyl chains. These plasticizers include alkyl adipates, alkyl sebacates and alkyl azelates. Other plasticizers of the desirable type are of the phosphorus containing plasticizers such as alkyl and aryl phosphates and phosphites. Also, aralkyl hydrocarbons having relatively long alkyl chains attached to rings (aromatic) nuclei are suitable. Such compounds include dodecylbenzenes, chlorinated paraffins and the like.

The lubricating component described in application Ser. No. 603,388 and which is incorporated in the foil, may consist of one or more of the higher aliphatic acids having 12 – 24 carbon atoms and salts of such acids with barium, cadmium, zinc, calcium and lead. Such salts may be formed by reacting directly or in solution, the higher aliphatic acids with the oxides, hydroxides or carbonates of these metals. The lubricating components may also be constituted of or can include paraffinic waxes polyamidic waxes, low-molecular-weight polyethylenes, silicone oils and higher aliphatic alcohols. When the aliphatic alcohols and acids are used, they should contain 12 – 24 carbon atoms and are preferably chosen from among stearic, lauric, palmitic and myristic acids, the corresponding alcohols and the barium, cadmium, zinc, calcium and lead salts of these acids.

The coloring component of the foil of application Ser. No. 603,388 preferably includes one or more blue, red, violet, green or yellow dyes of the type hitherto proposed for the dyeing of vinylic polymers. It was shown of considerable advantage to use especially blue, red and violet sheet materials. When blue-colored sheet materials were desired, the dye was preferably of the phthalocyanine type whereas the red dyes were preferably of the azoic type, preferred dyes were indigoid, anthroquinone, phthalocyanine and indanthrone pigments.

In the modification disclosed in the commonly assigned later filed application Ser. No. 798,781 (now U.S. Pat. No. 3,546,193) of Feb. 12, 1969 by Flaviano Glatti, it was pointed out that best results are obtained with respect to maximum growth with a cover for a plant enclosure, e.g. a greenhouse, cold frame or the like, when the composition is such that the minimum light transmittance of the foil lies within one of three primary spectral zones, namely, the spectral zones (in terms of wavelength) of 4,100 A to 4,500 A, of 4,900 A to 5,400 A and of 5,250 A to 5,750 A. The maximum transmittance lies in the range of 6,300 A to 7,500 A such that the maximum transmittance zone includes a secondary zone of 6,300 A to 6,600 A in which the transmittance at its maximum is greater than 50% and a secondary zone of 6,600 A to 7,500 A in which the maximum transmittance exceeds 70%. As a consequence, there is a minimum transmittance between 3,800 A and 5,900 A, a transmittance in excess of 50% at 6,300 A to 6,600 A and a transmittance in excess of 70% between 6,600 A and 7,500 A. The foils used in these systems generally constitute plant enclosures through which the growing plant is subjected to sunlight.

However, in recent years the use of flexible synthetic resin films for the mulching of an agricultural plot has received increased attention and is displacing the use of natural mulching materials for improving thermal conditions of the soil surrounding the desired plant, for hindering the growth of weeds capable of withdrawing moisture and food requirements from the desired plant or otherwise restricting its growth, such spurious growth being termed infesting plants and for limiting the loss of soil moisture by evaporation, promoting growth and forcing same, and in some cases, protecting the fruits of the plant. It may be noted that use of mulches is widespread in the growth of low vegetable and fruit crops as well as flower plants and have hitherto included straw, moss, dry leaves, wood chips, sawdust and the like.

More recently, as has been noted, thermoplastic films have constituted the mulching material and growth of the cultivated plants is permitted through openings in the mulching foil. In prior systems, the thermoplastic films have been rendered substantially opaque to visible light by the inclusion therein of carbon black to produce a black-colored film whose total light transmittance to sunlight in the visible range is close to zero. In practice, such films have been found to eliminate almost completely the growth of infesting plants in regions covered by the mulching foil and surrounding the opening through which the cultivated plant is induced to grow. Such systems have not, however any ability of promoting production, to force growth or otherwise induce a high agricultural yield, even of the desired plant.

While we do not wish to be bound to any theory in this regard, it appears to us that the reason for the aforementioned disadvantages is that such films have transmittance values close to zero in the near-infrared zone so that the sunlight does not directly irradiate the blackened foil, but is substantially completely absorbed thereby.

The film, in turn, irradiates the foil with high dissipation of energy in the infrared range. While it has been proposed to eliminate this drawback by the use of more or less transparent films with a total transmittance to sunlight of about 90% in the visible spectrum range and in the near infrared spectral range, these solutions have also proved to be unsatisfactory since, while they do increase the productivity of the agricultural plot, they also promote the growth of infesting plants and require the use of expensive selective herbicides to eliminate the infesting growth.

It is, therefore, the principal object of the present invention to provide growth-controlling films, especially for use in the mulching of fruit, vegetable and other plant growth which extends principles originally set forth in the commonly assigned applications mentioned earlier and which eliminates the disadvantages enumerated above.

A more specific object of the instant invention is the provision of a film of synthetic thermoplastic material adapted to promote growth of the cultivated plant while restricting undesirable growth when the film is used as a mulching.

Still further, it is an object of the present invention to provide an improved method of controlledly growing plants in sunlight.

These objects and others, which will become apparent hereinafter are attained, in accordance with the present invention, with a synthetic-resin thermoplastic film having a total transmittance, in percentage terms which, on the average, is less than 40% for sunlight of a wavelength of 300 – 700 m$\mu$ (1 m$\mu$ = 10 A), and on the average is in excess of 60% for sunlight with a wavelength above 900 m$\mu$. It has been found that these limits are critical to the thermoplastic film which, according to the present invention, is used as a mulch through openings in which the desired (cultivated) plant is grown.

According to a further feature of this invention, the film, which has a thickness of 0.01 to 0.5 mm, has a percentage total transmittance ranging between 0 and 10% for sunlight with a wavelength between 300 and 500 m$\mu$, of 0 to 35% for sunlight with a wavelength between 500 and 750 m$\mu$, from 0 to 90% for sunlight with a wavelength between 750 and 900 m$\mu$ and from 60 to 90% for sunlight with a wavelength above 900 m$\mu$. The transmittance of 60 to 90% m$\mu$ wavelength is preferably concentrated in the zone of 900 to 1,500 m$\mu$.

Most surprisingly, in the light of earlier experiences with mulching foils, it has been possible with the foil described above in accordance with the present invention to obtain sufficient warming of the soil to promote growth of the desired plant and to force said growth, without at the same time increasing moisture loss or promoting infesting growth. In other words, the mulching films of the present invention increase soil temperature and promote growth through the openings in the foil while preventing infesting growth in regions overlain by the film and also minimize moisture loss from the soil. While the films of the present invention are best described as mulching films, it may be noted that they can be used in horticulture and floriculture in open air, in greenhouses, in tunnels, etc. The films described in the last-mentioned copending applications may form the walls of the greenhouse in which the mulching foil is used.

As previously indicated, the basic thermoplastic composition may be of the type set forth in applications Ser. No. 603,388 and Ser. No. 798,781; in general terms, however, the composition may include eight components as outlined below:

1. A thermoplastic polymeric component, easily transformable into film and foils, such as polyvinylchloride, polyethylene, polypropylene, polymethylmethacrylate, ethylenevinylacetate copolymers and polyamides. These thermoplastic materials may be used alone or in mutual mixture.
2. A stabilizing component effective against heat and light and constituted, in the case of vinyl polymers, by barium-, cadmium-, lead-, zinc-, tin-, or magnesium-compound stabilizers, alone or in mutual admixture, and in the case of other polymers by stabilizers recognized as suitable therefor.

3. A thermal and light costabilizing component, which is preferably present but may be omitted, constituted, in the case of vinyl polymers, by one or more organic compounds containing in the molecule at least one epoxy group and, most suitably the higher epoxy esters containing from 22 to 150 carbon atoms.
4. A U-V absorbing component, preferably present but which can be omitted, capable of absorbing ultraviolet rays and of the known types mentioned earlier, generally based on benzophenones or substituted benzophenones, or on simple or substituted triazoles, optionally combined with a blueing agent or an optical whitening or bleaching agent or an antioxidation or oxygen scavenging agent of the type known to the art.
5. A plasticizing component, which preferably is present but may be omitted, constituted in the case of vinyl polymers by a mixture of one or more plasticizers of the phthalic type with a number of carbon atoms in the alkyl chain (carbon similar) ranging from 4 to 13, optionally used in conjunction with antioxidating substances such as substituted phenols, alone or in combination with polyalcohols, also in admixture with plasticizers of a type different from the phthalic esters, such as: (a) alkyl adipates with 4 to 13 carbon atoms in the alkyl chain; (b) alkyl sebacates with 4 to 13 carbon atoms in the alkyl chain; (c) alkyl azelates with 4 to 13 carbon atoms in the alkyl chain; (d) alkyl or aryl phosphates and phosphites; (e) alkylaromatic hydrocarbons, e.g. dodecylbenzenes and homologues thereof; and (f) chlorinated or sulphonated paraffins.
6. A lubricating component, which preferably is present but may be omitted, containing one or more of the following compounds: (a) higher aliphatic acids with 12 to 24 carbon atoms, such as stearic acid, lauric acid, palmitic acid, and myristic acid or their barium, cadmium, zinc, calcium and lead salts; (b) paraffin waxes; (c) polyamide waxes; (d) low-molecular-weight polyethylenes; (e) silicone oils; (f) lubricating mineral oils; and (g) higher aliphatic alcohols containing from 12 to 24 carbon atoms.
7. A filler component, which preferably is present but may be omitted, consisting of $CaCO_3$ powder or another inert powder-filler conventionally used in films.
8. A coloring component consisting of one or more conventional dyestuffs of such type and in such quantity that the thermoplastic materials, in the forms of films, plates and the like have an absorption spectrum characterized by a total light transmittance (to sunlight) of less than 40% for light with a wavelength of 300 to 700 m$\mu$ and a total light transmittance to sunlight of at least 60% for wavelength above about 900 m$\mu$ but preferably between 900 and 1,500 m$\mu$. The light transmittance characteristics of the material should correspond to the following table:

| Wavelength (m$\mu$) | Total transmittance (%) |
|---|---|
| 300 to 500 | 0 to 10 |
| 500 to 750 | 0 to 35 |
| 750 to 900 | 0 to 90 |
| >900 | 60 to 90 |

For illustrative purposes and to clarify this invention, several types of dyeing or coloring substances will be indicated, the use of which has proved to be particularly advantageous for the purpose of this invention. In the case of yellow dyes, azoic dyes derived from acetylacetoarylide and from pyrazolone have proved to be particularly suitable. In the case of red dyes the high-molecular weight azoic dyes derived from pyrazolone have proved to be particularly suitable. Finally, in the case of blue and green dyes, synthetic dyes derived from phthalocyanine and chlorinated phthalocyanine are preferred. For violet dyes, synthetic vat dyes based on thioindigo are used.

The actual composition of the polymeric materials according to the invention varies in dependence upon the additives used for components (2) to (8), supra.

Best results are obtained using transparent colored polymeric materials in the form of films, containing (for each 100 parts by weight of synthetic thermoplastic polymer (1)):

0.5 to 10 parts by weight of the stabilizing component (2) effective against heat and light;
  0 to 30 parts by weight of the costabilizing component (3) effective against heat and light;
  0 to 2 parts by weight of the ultraviolet-ray-absorbing component; (4);
  0 to 100 parts by weight of the plasticizing component (5);
  0 to 5 parts by weight of the lubricating component (6);
  0 to 100 parts by weight of inert fillers (7);
  0.00001 to 10 parts by weight (preferably 1 to 10 parts by weight of the dyeing component (8);

Below is given a typical composition within the scope of the present invention:

| | | |
|---|---|---|
| Sicron 548 (trademark of Montecatini Edison S.p.A.) Homopolymer prepared by suspension polymerization of vinyl chloride | 100 | parts by weight |
| Barium-cadmium thermal stabilizer (Ba/Cd ration=½) | 3 | do. |
| Expoxidized soybean oil | 5 | do. |
| 2-hydroxy-4-methoxybenzophenone | 0.25 | do. |
| Dioctylphthalate (with 0.2% by weight bisphenol A) | 50 | do. |
| Tricresylphosphate | 10 | do. |
| Stearic acid | 0.5 | do. |
| Dyeing substances | 4 | do. |

The polymeric materials according to the invention, in the form of films, containing the synthetic thermoplastic polymer in admixture with the additive components (2) to (8), supra, may be transformed into films and plates by the methods described in application Ser. No. 603,388 and those commonly used in the field of plastic processing. For example, colored films of the polymeric materials according to the invention may be prepared by the extrusion of granules or powders (dry-blends) which may be partially gellified constituted by the synthetic polymer in admixture with the above-mentioned additives.

This mixture, both in the form of powders as well as of granules, is obtained by first mixing cold and then at temperatures of up to 120°C the polymer with the additives. The mixture thus obtained is transformed into a homogeneous mass, at a temperature varying between 120°C and 180°C to gellification and is then introduced into a granulator, constituted, for instance, by an extruder fitted with an apertured head provided with a rotating chopping blade at the end of the extrusion head.

The granules thus obtained are then transformed into films on extruders with heads suitably shaped to meet the various requirements of use.

The polymeric materials according to this invention, in the form of plasticized films, as well as of plasticized or rigid plates, show by comparison with glass, a greater resistance to impact, a reduced specific weight, and a lower setting-up cost because of the less expensive supporting structures required.

The polymeric films in which the polymeric component is polyvinylchloride, according to the invention, are characterized by the following mechanical properties:

Elastic modulus (ASTM D 882) greater than 0.3 but preferably between 0.7 and 1.5 kg/mm$^2$;
Breaking load (ASTM) greater than 0.7, but preferably from 2 to 3 kg/mm$^2$;
Percent elongation at break, longitudinally, (ASTM D 882) greater than 100%, but preferably between 250% and 400%; Tear resistance (ASTM D 689):
 longitudinally greater than 1,000, but preferably between 2,000 and 8,000 g/mm;
 transversally greater than 1,000, but preferably between 3,500 and 8,000 g/mm;
Static thermal stability, unaltered after 200 minutes at 170°C; Stability to light with the Weather-O-meter (E 42/66) unaltered after 1,000 hours.

EXAMPLE 1

Three series of films were prepared having a thickness of 0.10 mm, based on polyvinyl chloride and having each a composition as set forth in Table I.

TABLE I

|  |  | A | B | C |
|---|---|---|---|---|
| Polyvinyl chloride | parts by weight | 100 | 100 | 100 |
| Plasticizers (2) | do. | 52 | 52 | 52 |
| Stabilizers (3) | do. | 3 | 3 | 3 |
| Dyeing substances: |  |  |  |  |
| Black (4) | do. | — | — | 2 |
| Yellow (5) | do. | 0.5 | — | — |
| Red (6) | do. | 1.5 | — | — |
| Blue (7) | do. | 0.3 | — | — |
| Violet (8) | do. | 0.8 | — | — |
| Ultraviolet absorber (9) | do. | 0.8 | — | — |

These films had the mechanical characteristics specified in TABLE II.

TABLE II

| Type of determination |  | STM Analysis methods | Values |
|---|---|---|---|
| Specific weight at 23°C in g/cc |  |  | 1.235 |
| Cold Flex temperature in °C |  | D1043-61T | −21 |
| "Shore" hardness |  |  | 82 |
| Modulus kg/mm$^2$ | on film, longitudinally | D882-61T | 1.30 |
| Breaking load kg/mm$^2$ |  |  | 2.55 |
| Elongation % |  |  | 340 |
| Modulus kg/mm$^2$ | on film, transversally | D882-61T | 1.20 |
| Breaking load kg/mm$^2$ |  |  | 2.50 |
| Elongation % |  |  | 350 |
| Burst resistance, kg/cm$^2$ |  |  | 2.90 |
| ELMENDORF tearing resistance on film | long. g/mm | 23°C D1922-61T | 4300 |
| do. | transv. g/mm |  | 5000 |
| ELMENDORF tearing resistance on film | long. g/mm | 10°C D1922-61T | 2800 |
| do. | transv. g/mm |  | 3500 |
| ELMENDORF tearing resistance on film | long. g/mm | 0°C D1922-61T | 2300 |
| do. | transv. g/mm |  | 2600 |

Finally, the three films had optical characteristics as set out in Table III.

TABLE III

TOTAL PERCENTAGE TRANSMITTANCE

| Wavelength | A | B | C |
|---|---|---|---|
| 300 mµ | pract. null | 13 | null |
| 350 do. | do. | 14 | do. |
| 400 do. | do. | 82 | do. |
| 450 do. | do. | 88 | do. |
| 500 do. | do. | 88 | do. |
| 550 do. | do. | 89 | do. |
| 600 do. | 4% | 90% | do. |
| 650 do. | 28% | 91% | do. |
| 700 do. | 25% | 91% | do. |
| 750 do. | 45% | 91% | do. |
| 800 do. | 82% | 91% | do. |
| 850 do. | 85% | 91% | do. |
| 900 do. | 85% | 91% | do. |
| 950 do. | 85% | 91% | do. |
| 1000 do. | 85% | 91% | do. |

The measurements of the total transmittance were made by means of a Hitachi-Perkin-Elmer spectrophotometer, provided with an integrating sphere, suitably adapted to this kind of determination.

No transmittance data have been given for wavelengths below 300 mµ. because, for such wavelengths, solar radiations are almost completely absorbed by the atmosphere and are of no interest with respect to cultivation.

As can easily be ascertained from Table III, film A, according to this invention, has transmittance values practically near zero for the greatest part of the visible spectrum, that is, up to 600 mμ; relatively low transmittance values, that is less than about 30%, in the remaining field of the visible spectrum (from 600 to 750 mμ), and very high transmittance values very close to those ones of a transparent film in the spectral zone of the near infrared (over 750 mμ).

The transparent film B, in its turn shows on the contrary, very high transmittance values both in the zone of the visible spectrum as well as in the zone of the near infrared.

The black film C, finally, is characterized by transmittance values very close to zero, both in the visible spectrum, as well as in the near infrared spectrum.

The tests for determining the agricultural characteristics of the films according to the invention were conducted in the following manner;

Under three greenhouse-tunnels of the following size: height 2.50 m, width 5.50 m and length 60 m, and for which as covering material was used a transparent film based on polyvinyl chloride with chemical-physical characteristics identical with those of the film previously indicated in B, cultivation of melons (Cucurbita Melo Cantolupensis; Hybrid F 1/N.16) was carried out in three rows, of which the middle one, undisturbed by the adjacent rows, was mulched with the three films marked A, B and C for a length of 20 m each, located under the three greenhouse-tunnels according to a latin-square arrangement.

On each plot of 14 meters, 60 seeds were sowed so as to obtain 20 plants spaced 70 cm one from each other, by making holes in the mulch at the spots where the seeds had been planted.

The greenhouse-tunnels were located on the farmland attached to the "Centro per l'Applicazione delle Materie Plastiche all'Agricoltura" of Montecatini Edison in Mantua, Italy.

The tunnel-greenhouses were North-East- South West oriented and placed on a plot of land free of hight-obstructing trees and from buildings.

The tunnel-greenhouses were further provided with equipment for ensuring a suitable ventilation of the inside of the tunnels.

The agricultural tests were carried out during 1967, in the period from Mar. 5 to June 20. The results achieved during such cultivation are summarized in the following TABLE IV:

TABLE IV

| Agronomical data: | Type of film | | |
|---|---|---|---|
| | A | B | C |
| Crop on May 31: | | | |
| Number of fruit | 22 | 9 | 13 |
| Total weight | Kg. 23.650 | 5.700 | 10.590 |
| Mean weight of fruit | do. 1.075 | 0.633 | 0.815 |
| Crop on June 10: | | | |
| Number of fruit | 76 | 22 | 51 |
| Total weight | do. 80.180 | 13.530 | 41.050 |
| Mean weight of fruit | do. 1.055 | 0.615 | 0.805 |
| Crop on June 20: | | | |
| Number of fruit | 92 | 41 | 80 |
| Total weight | do. 95.220 | 24.800 | 63.600 |
| Mean weight of fruit | do. 1.035 | 0.605 | 0.795 |

The data reported in Table IV represents the average values of the data of the three repetitions. From the above reported data it will be quite evident what a considerable improvement was surprisingly achieved by use of the films according to the invention.

More particularly, it will be observed that the use of film A (film according to the invention) gives greater growth rate at yield, as is evidenced by the greater weight of the fruits which are also present in a number considerably greater than that obtainable when a transparent or black film (B and C) is used in all cultivations.

More particularly, the poor production and the low weight of the fruits obtained in the case in which transparent film B is used, may be ascribed mainly to the presence of infesting plants which exert a real stiffling action on the cultivations.

As far as the considerable improvements achieved, also in comparison with the use of the black film (C) is concerned, it must be stressed that this is apparently made possible by the high transparency of the film according to this invention (film A) in the spectral zone of near infrared, which allows the roots of the plants to be exposed in a quantity of heat considerably greater than that obtainable with the black film which does not allow the passage of radiation of the near infrared zone.

The measurements of the temperature of the soil covered with the three films A, B and C of the above defined type, as evidenced by TABLE V confirm the validity of the agronomical data listed previously.

| Time (hrs) | Type of film | | | Time (hrs) | Type of film | | |
|---|---|---|---|---|---|---|---|
| | A | B | C | | A | B | C |
| 1400 (2 pm) | 50 | 48 | 43 | 2400 | 30 | 29.5 | 28 |
| 1500 | 52 | 49 | 44 | 100 | 29 | 28.5 | 27 |
| 1600 | 46.5 | 45.5 | 41 | 200 | 28 | 27 | 26 |
| 1700 | 42 | 41 | 37.5 | 300 | 27 | 26 | 25.5 |
| 1800 | 39.5 | 39 | 35 | 400 | 26.5 | 25.5 | 25 |
| 1900 | 37 | 36.5 | 33.5 | 500 | 26 | 25 | 24.5 |
| 2000 | 33.5 | 33 | 32 | 600 | 25 | 24.5 | 24 |
| 2100 | 33.5 | 33 | 30.5 | 700 | 25 | 24.5 | 24 |
| 2200 | 32 | 32 | 29 | 800 (8 am) | 25 | 24.5 | 24 |
| 2300 | 31 | 31 | 28 | | | | |

The measurements of the temperature of the soil were taken at a depth of 5 cm by means of thermoresistances.

As can be easily noted from the data reported in Table V, the temperature of the soil covered with a film according to this invention (type A) remains distinctly higher than that of the soil covered with a black film (C), and practically indentical with or slightly higher than that of the soil covered with a transparent film (B).

The results shown by the preceding Example are also obtained by using films according to this invention for cultivations conducted in the open air.

EXAMPLE 2

A cultivation of Asparagus (*Asparagus Officinalis*, *Argentuil precocius* variety) was carried out under a tunnel-greenhouse having the following dimensions: height 2m; width 4m; length 50m; this tunnel-greenhouse was covered by a transparent film B of the type described in Example 1.

The cultivation of asparagus was carried out with a four-year old culture suitable for forcing.

For this reason the roots were originally placed at a depth of 4 cm instead of 60 cm as in common cultivations. This permits complete utilization of solar heat, which heat quickly reaches the roots, causing the turions to start.

Inside that tunnel-greenhouse, three small tunnels were located having the following dimensions: width 0.90 m; length 50 m; height 0.80 m. The three small tunnels were respectively covered with the films A, B and C, specifically defined in Example 1.

The film B (transparent film) was used for the production of a green asparagus, while the film C (black film) was used for the production of the white asparagus. Finally, the film A (according to the invention) was used for the production of a white asparagus.

The test was carried out according to a random-block scheme with four applications.

The agronomical results for the three small tunnels were the following

Tunnel with film C (white asparagus).

A white asparagus of good quality was obtained starting from Mar. 24, 1968. No growth of infesting herbs was noticed.

Tunnel with film B (green asparagus)

A green asparagus of good quality was obtained starting from Mar. 12, 1968. In this case a material growth of infesting plants was observed, requiring two weedings.

Tunnel with film A (white asparagus)

A white asparagus of good quality was obtained starting from Mar. 12, 1968. No growth of infesting herbs was noticed.

From the above results the remarkable improvement connected with film Δ (according to the invention) becomes evident. In fact, in this specific case, the surprising result is attained of obtaining a white asparagus with an advance of twelve days with respect to film C (black film), without having any growth of infesting herbs as in the cultivation of the green asparagus under film B (transparent film).

EXAMPLE 3

A protected cultivation of Gladiulus Hybridus (three varieties: Polygoon yellow; Princess des Nieges, white; Sans Souci, scarlet) was carried out in the farm "Tor di Mezzavia" Rome of Montecatini Edison S.p.A.

The cultivations was carried out under a tunnel-greenhouse, having the following dimensions: width 5.50 m; height 2.3 m; length 80 m.

The tunnel-greenhouse was covered by a transparent film B of the type specified in Example 1.

Inside the tunnel-greenhouse, the ground, on which the cultivation was carried out, had been previously mulched by the three films A, B and C of the type specified in example 1.

The films were perforated and the bulbs of gladiulus were planted in the ground in the holes made in the films.

The test was carried out according to a random-block scheme with four replications. The results obtained for all three the varieties are hereinunder summarized.

Film B

An anormous growth of infesting herbs took place; these herbs practically chocked the cultivation; very few ears were obtained with a slender stem having an average length of from 1 to 1.2 m depending on the variety.

Film C

No growth of infesting herbs was noticed; well formed ears were obtained with a stem having an average length of from 1.5 to 1.7 m depending on the varieties.

Film A

No growth of infesting herbs was noticed; well formed ears were obtained with a stem having an average of from 1.6 to 1.8 m depending on the varities; in addition in respect to film C an advance of 8 days was attained. From the above data the remarkable improvement attained by the films according to the invention becomes evident, even when flower cultivations are carried out.

Furthermore, even if the results shown in the preceding examples have been obtained still by using polyvinyl chloride films, it is quite evident that equally favourable results may be obtained also by the use of films based on other thermoplastic polymers, different from polyvinyl chloride, such as for instance polyethylene, polypropylene, ethylene/vinyl acetate copolymers, polymethylmetacrylate polyamides and the like, admixed to dyestuffs of such a kind as to provide them with the above cited optical characteristics.

We claim:

1. The combination with an agricultural growth medium exposed to the sun of a flexible film of synthetic thermoplastic material interposed between the sun and the agricultural growth medium and having total light transmittance to sunlight with a wavelength between 300 and 700 m$\mu$ of less than 40% and average total light transmittance for sunlight with a wavelength greater than 900 m$\mu$ of at least 60%, the total transmittance of the film to sunlight between 900 and 1500 m$\mu$ being on the average greater than 60%, the flexible film having a thickness of 0.01 to 0.5 mm and light transmittance characteristics for sunlight corresponding to the following table:

| Wavelength (m) | Total Transmittance (%) |
| --- | --- |
| 300 to 500 | 0 to 10 |
| 500 to 750 | 0 to 35 |
| 750 to 900 | 0 to 90 |
| 900 to 1500 | 60 to 90, | said film being formed with an opening through which a plant is grown and surrounding said plant for restricting growth there-around.

2. A method of growing a plant in an agricultural plot comprising the step of causing a plant to grow through an opening provided in a flexible film having a thickness of 0.01 to 0.5 mm and light transmittance characteristics for sunlight corresponding to the following table:

| Wavelength (mμ) | Total transmittance (%) |
|---|---|
| 300 to 500 | 0 to 10 |
| 500 to 750 | 0 to 35 |
| 750 to 900 | 0 to 90 |
| 900 to 1500 | 60 to 90 | while covering regions of the plot surround said opening with said film and exposing the plot to sunlight.

3. The combination defined in claim 1 wherein the film comprises a polymer and 1 to 10 parts by weight of a dyestuff per 100 parts by weight of polymer.

4. The combination defined in claim 3 wherein the polymer in said film consists at least predominantly of polyvinyl chloride.

* * * * *